(12) United States Patent
Bhadra et al.

(10) Patent No.: US 8,874,876 B2
(45) Date of Patent: Oct. 28, 2014

(54) METHOD AND APPARATUS FOR PACKET SWITCHING

(75) Inventors: Sandeep Bhadra, Dallas, TX (US);
Aman A. Kokrady, Bangalore (IN);
Patrick W. Bosshart, Plano, TX (US);
Hun-Seok Kim, Addison, TX (US)

(73) Assignee: Texas Instruments Incorporated, Dallas, TX (US)

( * ) Notice: Subject to any disclaimer, the term of this patent is extended or adjusted under 35 U.S.C. 154(b) by 409 days.

(21) Appl. No.: 13/323,594

(22) Filed: Dec. 12, 2011

(65) Prior Publication Data

US 2012/0246400 A1 Sep. 27, 2012

Related U.S. Application Data

(60) Provisional application No. 61/466,232, filed on Mar. 22, 2011.

(51) Int. Cl.
*G06F 12/08* (2006.01)
*H04L 12/56* (2006.01)
*H04L 12/935* (2013.01)
*H04L 12/931* (2013.01)

(52) U.S. Cl.
CPC .......... *H04L 49/3009* (2013.01); *H04L 49/356* (2013.01)
USPC ............................ 711/216; 370/392; 711/108

(58) Field of Classification Search
None
See application file for complete search history.

(56) References Cited

U.S. PATENT DOCUMENTS

| | | | |
|---|---|---|---|
| 7,028,098 B2 | 4/2006 | Mate et al. | |
| 7,139,867 B2 * | 11/2006 | Feldmeier et al. | 711/108 |
| 7,193,874 B1 * | 3/2007 | Pereira et al. | 365/189.15 |
| 7,234,019 B1 | 6/2007 | Kao et al. | |
| 7,356,033 B2 | 4/2008 | Basu et al. | |
| 7,382,787 B1 | 6/2008 | Barnes et al. | |
| 7,602,787 B2 | 10/2009 | Cheriton | |
| 2005/0262294 A1 | 11/2005 | Bitar | |
| 2009/0097654 A1 | 4/2009 | Blake | |
| 2009/0190386 A1 | 7/2009 | Kim | |
| 2011/0161580 A1 | 6/2011 | Shah et al. | |

OTHER PUBLICATIONS

PCT Search Report mailed Oct. 19, 2012.
"OpenFlow Switch Specification,"Version 1.1.0 Implemented ( Wire Protocol 0x02 ), Feb. 28, 2011, pp. 1-56.
"Carrier Sense Multiple Access With Collision Detection (CSMA/CD) Access Method and Physical Layer Specifications," IEEE Standard 802.3ap, May 22, 2007, pp. 1-203.
"Carrier Sense Multiple Access With Collision Detection (CSMA/CD) Access Method and Physical Layer Specifications," IEEE Standard 802.3ba-2010, Jun. 22, 2010, pp. 1-457.
"PortLand: A Scalable Fault-Tolerant Layer 2 Data Center Network Fabric," SIGCOMM 2009, Aug. 17-21, 2009 (Mysore, et al.), 12 pages.

* cited by examiner

*Primary Examiner* — Gary Portka
(74) *Attorney, Agent, or Firm* — Alan A. R. Cooper; Frederick J. Telecky, Jr.

(57) ABSTRACT

A method for performing packet lookups is provided. Packets (which each have a body and a header) are received and parsed to parsing headers. A hash function is applied to each header, and each hashed header is compared with a plurality of binary rules stored within a primary table, where each binary rule is a binary version of at least one ternary rule from a first set of ternary rules. For each match failure with the plurality of rules, a secondary table is searched using the header associated with each match failure, where the secondary table includes a second set of ternary rules.

20 Claims, 7 Drawing Sheets

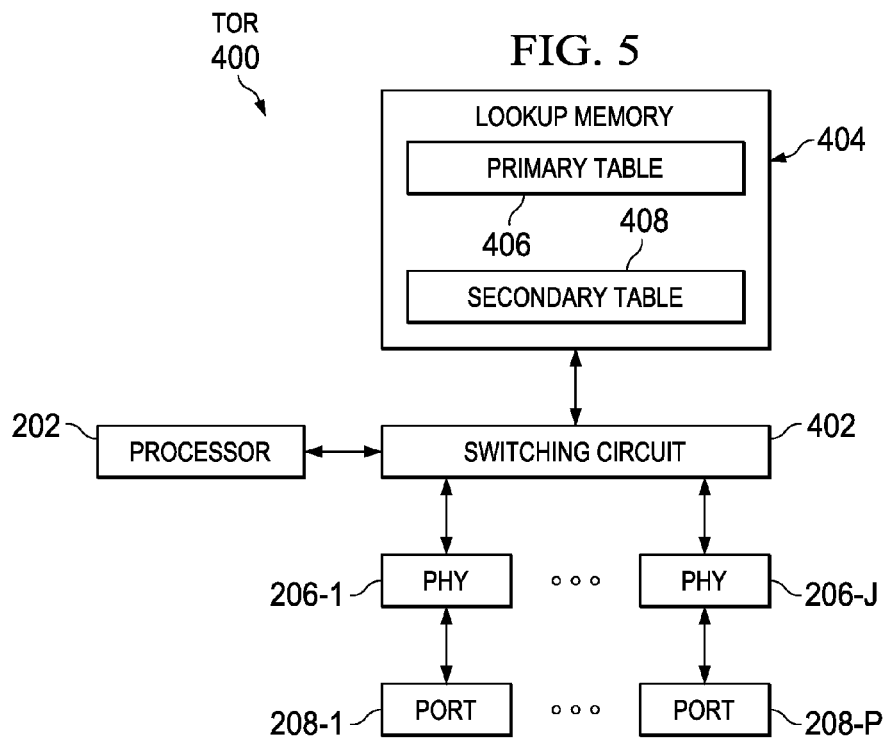
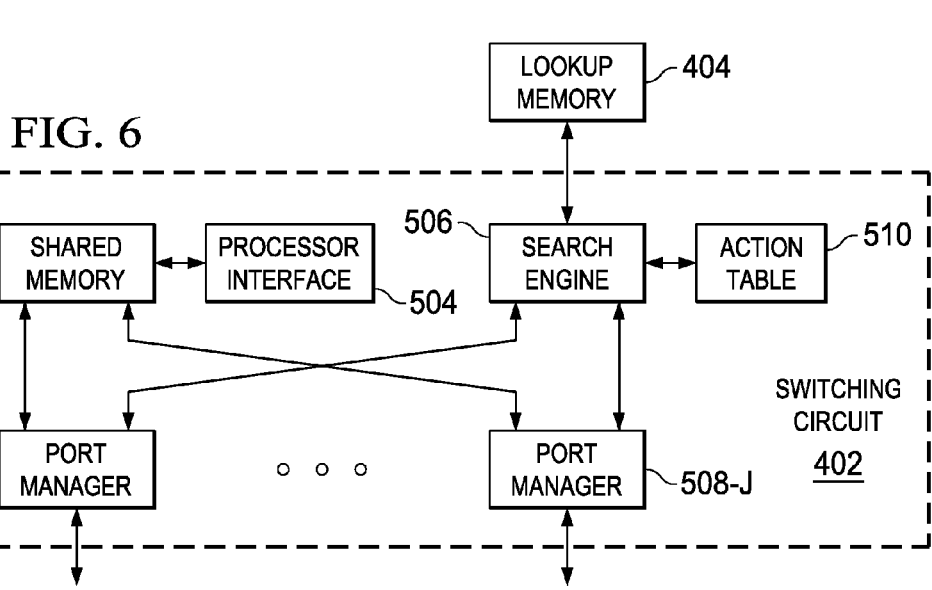

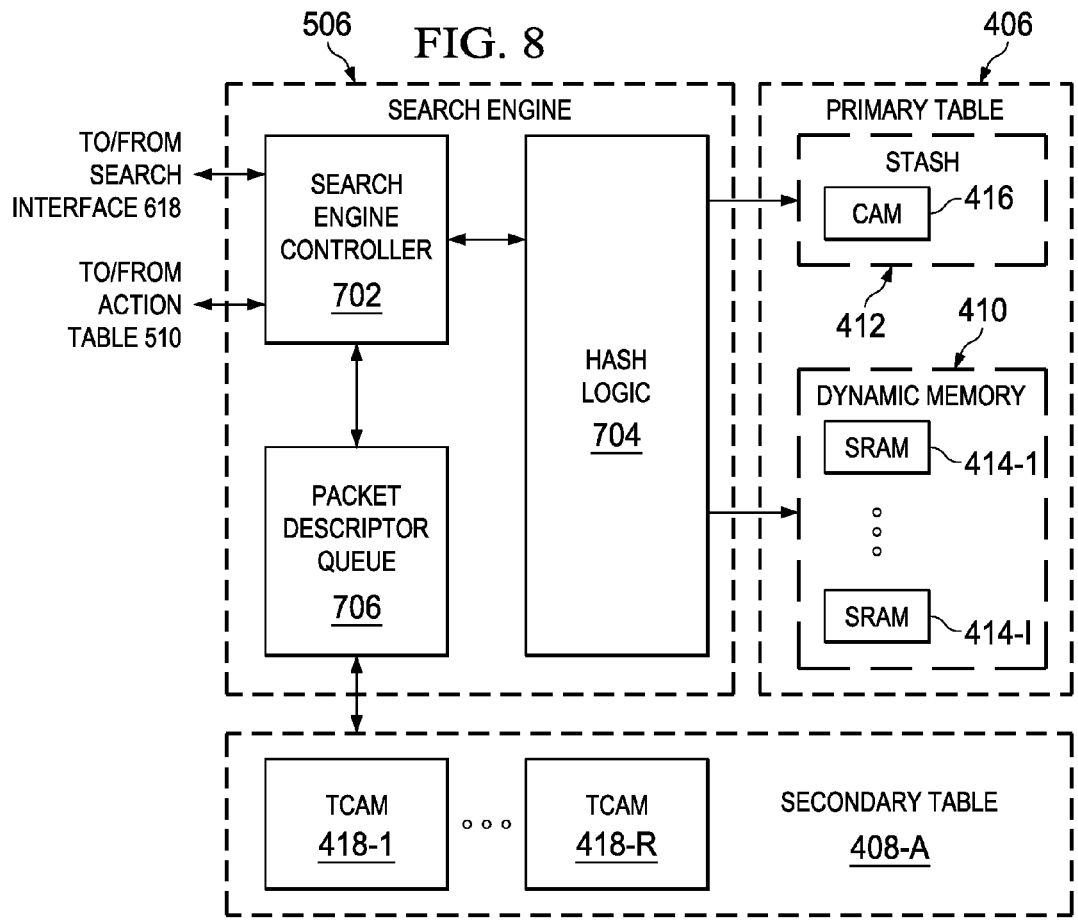
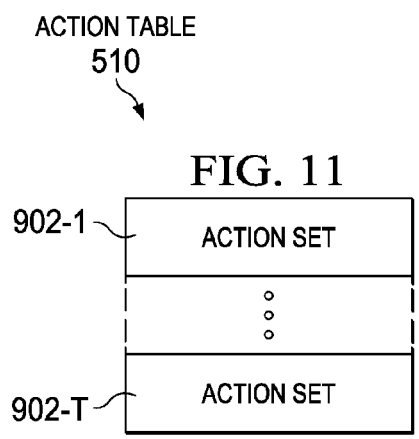

METHOD AND APPARATUS FOR PACKET SWITCHING

CROSS-REFERENCE TO RELATED APPLICATIONS

This application is a Nonprovisional of U.S. patent application Ser. No. 61/466,232, entitled VERY HIGH-SPEED PACKET LOOK-UPS USING HASHING TECHNIQUES AND INTELLIGENT CACHING," filed on Mar. 22, 2011, which is hereby incorporated by reference for all purposes.

TECHNICAL FIELD

The invention relates generally to packet switching and, more particularly, to top-of-rack (TOR) switches.

BACKGROUND

Turning to FIG. 1, a diagram of the conventional routing model for packet switching networks can be seen. In this model, a core network 112 communicates over the internet 102 through core routers 104-1 to 104-N. The core network 112 generally communicates with the core routers 104-1 to 104-N with intermediate switches 106-1 to 106-M; usually, two intermediate switches (i.e., 106-1 and 106-2) communicate with a core router (i.e. 104-1). The intermediate switches 106-1 to 106-M are then each able to communicate with each aggregate switch 108-1 to 108-K, which are each in communication with TOR switches 110-1 to 110-L. These TOR switches 110-1 to 110-L can then each be in communication with several (i.e., 20) servers.

Of interest here are the TOR switches 110-1 to 110-K, and a diagram of an example of a TOR switch (which is labeled 110) can be seen in FIGS. 2 and 3. Usually, as part of a data center, servers are held in a "rack" and the TOR switch 110 is located within the rack (typically at the top) so as to operate as a forwarding switch. As shown, this TOR switch 110 is generally comprised of a processor 202, switching circuit 204, a ternary context-addressable memory (TCAM) 210, and input/output (I/O) circuitry (which generally includes physical layer (PHY) circuit 206-1 to 206-J and ports 208-1 to 208-P), and the switching circuit 204 generally comprises an input queue 302, a parser 304, a search engine 306, processor interface 308, action circuit 310, and output queue 312. In operation, data packets (which each generally have a header and a body) are received through the ports 208-1 top 208-P and PHY circuits 206-1 to 206-J. These packets are stored in the input queue 302 (which is typically a first-in-first-out (FIFO) circuit), and the parser 304 is able to extract the header from these queued packets. Using the extracted headers, the search engine 210 is able to search the TCAM 210 to determine a rule associated with the header, where each rule is associated with an action. Once identified, the action circuit modifies the packet (usually the header) in accordance with the action associated identified rule. The modified packet is then placed in the output queue 312 (which is typically a FIFO circuit) so as to be transmitted.

Specifically and as detailed above, the search engine 306 performs packet lookups using the TCAM 210, which is a high speed memory that allow for matches over a large database of ternary packet-forwarding rules (i.e., Access Control Lists, Destination IP rules, and NetFlow rules). TCAM 210, though, consume several multiples of power and area compared to other memory types (such as SRAM or embedded DRAM) making it difficult to embed large TCAMs on-chip. As a result, TOR switches 110-1 to 110-L suffer from in penalties of power and area, as well as limited flexibility because the TOR switches 110-1 to 110-L set the forwarding rules. Therefore, there is a need for an improved TOR switch with a lower cost and higher flexibility.

Some other conventional systems are: U.S. Pat. No. 7,028, 098; U.S. Pat. No. 7,234,019; U.S. Pat. No. 7,382,787; U.S. Patent Pre-Grant Publ. No. 2005/0262294; U.S. Patent Pre-Grant Publ. No. 2011/0161580; and Mysore et al., "PortLand: A Scalable Fault-Tolerant layer 2 Data Center Network Fabric," *SIGCOMM* 2009, Aug. 17-21, 2009.

SUMMARY

An embodiment of the present invention, accordingly, provides an apparatus. The apparatus comprises a lookup memory having a primary table and a secondary table, wherein the secondary table includes a first set of ternary rules, and wherein the primary includes a set of binary rule, and wherein each binary rule is a binary version of at least one ternary rule from a second set of ternary rules; and a search engine that is coupled to the lookup memory, wherein the search engine includes: an controller that is configured to receive data words; and hash logic that is coupled to lookup memory and the controller, wherein the hash logic is configured to perform a binary search of the primary table to determine whether each data word matches at least one of the binary rules, and wherein, if there is a failed match by hash logic and primary table, the search engine is configured to perform a ternary search of the secondary table to determine whether the data word associated with the failed match matches at least one of the ternary rules from the first set of ternary rules.

In accordance with an embodiment of the present invention, the primary table further comprises: a dynamic memory; and stash.

In accordance with an embodiment of the present invention, the stash is a content-addressable memory (CAM).

In accordance with an embodiment of the present invention, the dynamic memory is a static random access memory (SRAM).

In accordance with an embodiment of the present invention, the secondary table further comprises a Ternary CAM (TCAM).

In accordance with an embodiment of the present invention, the apparatus further comprises: a shared memory; a plurality of port managers, wherein each port manager includes: an communication circuitry that is configured to receive input data packets and that is coupled to the shared memory and the search engine; and a parser that is coupled to the communication circuitry, wherein the parser is configured to parse each input data packet and extract its header, wherein each data word is associated with at least one header.

In accordance with an embodiment of the present invention, the apparatus further comprises an action table that is in communication with the search engine.

In accordance with an embodiment of the present invention, the communication circuitry further comprises: a media access controller (MAC) that is coupled to the parser; a transmit pipeline that is coupled between the shared memory and the MAC; a receive pipeline that is coupled between the shared memory and the MAC; and a search interface that is coupled between the parser and the search engine.

In accordance with an embodiment of the present invention, the hash logic applies a keyed hash function to each data word.

In accordance with an embodiment of the present invention, a method is provided. The method comprises receiving a plurality of packets, wherein each packet has a body and a header; parsing each packet to extract its header; applying a hash function to each header; comparing each hashed header with a plurality of binary rules stored within a primary table, wherein each binary rule is a binary version of at least one ternary rule from a first set of ternary rules; and for each match failure with the plurality of rules, searching a secondary table using the header associated with each match failure, wherein the secondary table includes a second set of ternary rules.

In accordance with an embodiment of the present invention, the step of searching the secondary table further comprises simultaneously searching a plurality of banks within the TCAM.

In accordance with an embodiment of the present invention, the method further comprises: generating a new rule and a new action for each match failure; and storing the new rule and new action in the SRAM.

In accordance with an embodiment of the present invention, the hash function is a keyed hash function.

In accordance with an embodiment of the present invention, an apparatus is provided. The apparatus comprises a primary table including a set of binary rule, and wherein each binary rule is a binary version of at least one ternary rule from a first set of ternary rules; a secondary table including a first set of ternary rules; a switching circuit having: a shared memory; a search engine including: an controller that is configured to receive data words; and hash logic that is coupled to lookup memory and the controller, wherein the hash logic is configured to perform a binary search of the primary table to determine whether each data word matches at least one of the binary rules, and wherein, if there is a failed match by hash logic and primary table, the search engine is configured to perform a ternary search of the secondary table to determine whether the data word associated with the failed match matches at least one of the ternary rules from the first set of ternary rules; and a plurality of port managers that are each in communication with the search engine; and input/output (I/O) circuit that is in communication with the switching circuit.

In accordance with an embodiment of the present invention, the I/O circuitry further comprises: a plurality of physical layer (PHY) circuits, wherein each PHY circuit is in communication with the switching circuit; and a plurality of ports, wherein each port is in communication with at least one of the PHY circuits.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 5 is a diagram of an example of a TOR switch of FIG. 4;

FIG. 6 is a diagram of an example of a switching circuit from the TOR switch of FIG. 5;

FIGS. 8 and 9 are diagrams of examples of the search engine and lookup memory of FIGS. 5 and 6;

FIG. 11 is a diagram depicting an example of the action table of FIG. 5;

DETAILED DESCRIPTION

Figure 1:
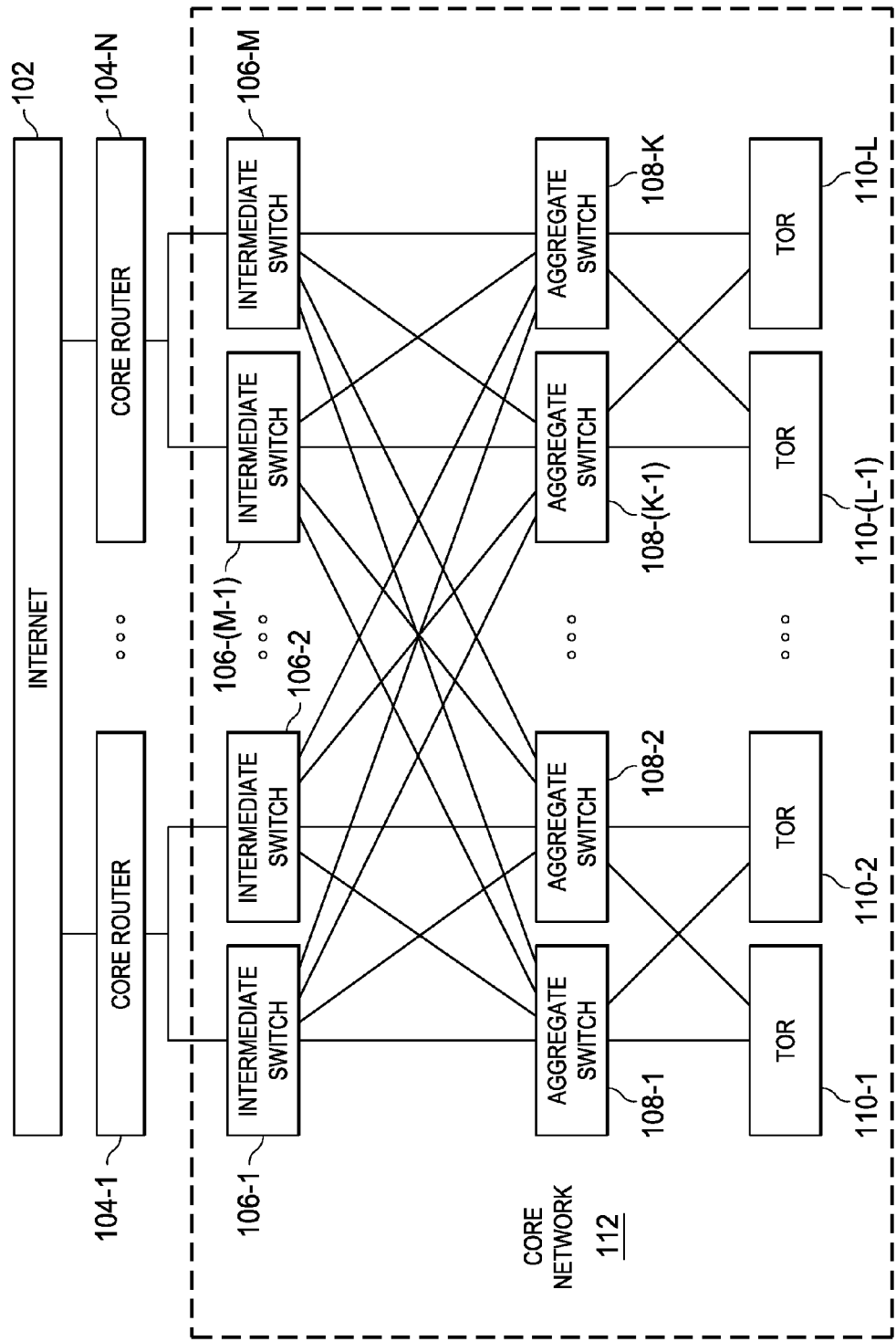
FIG. 1 is a diagram of a conventional routing model for a switched packet network.
Figure 2:
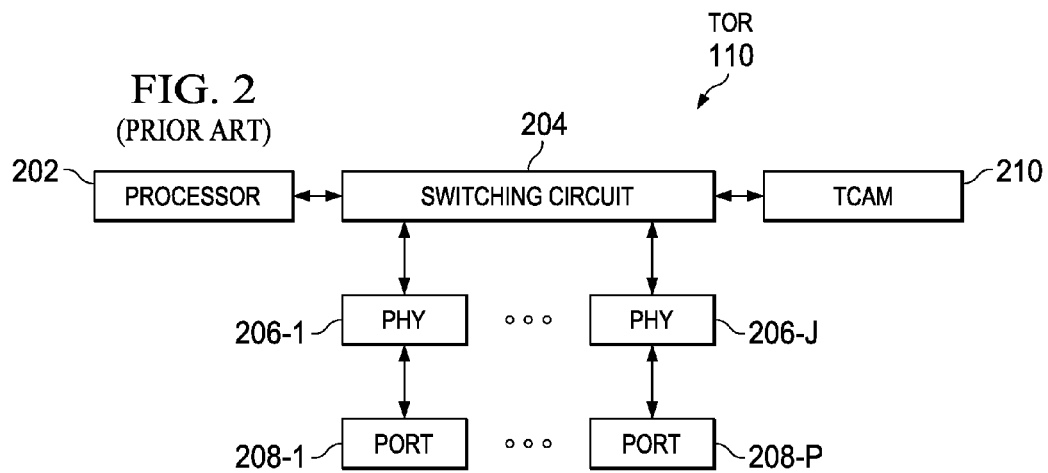
FIG. 2 is a diagram of a conventional TOR switch of FIG. 1.
Figure 3:
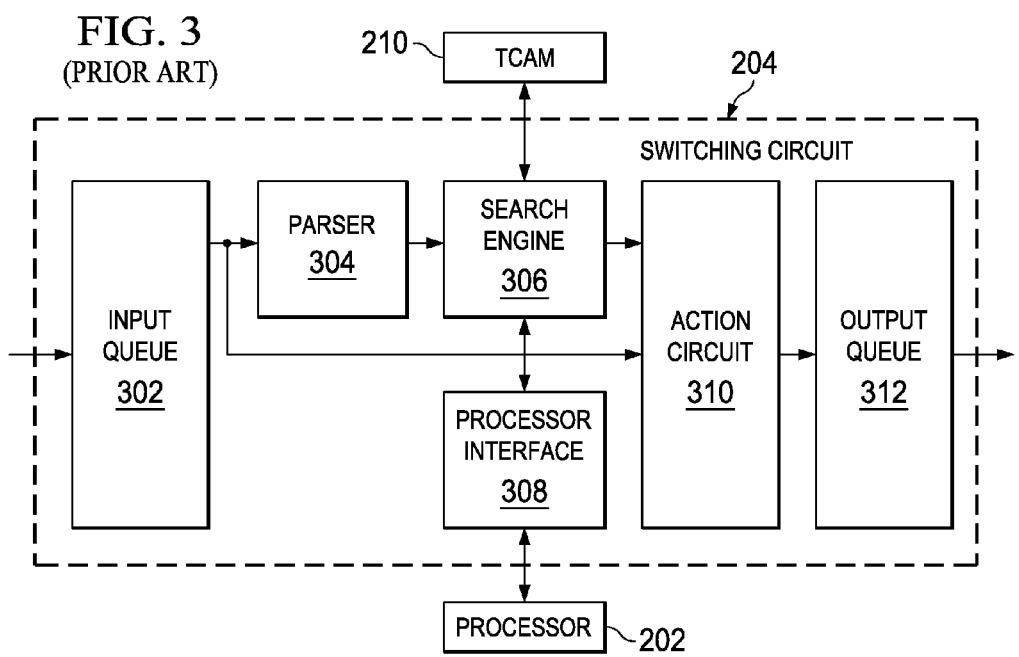
FIG. 3 is a diagram of the switching circuit from the TOR switch of FIG. 2.

Refer now to the drawings wherein depicted elements are, for the sake of clarity, not necessarily shown to scale and wherein like or similar elements are designated by the same reference numeral through the several views.

Figure 4:
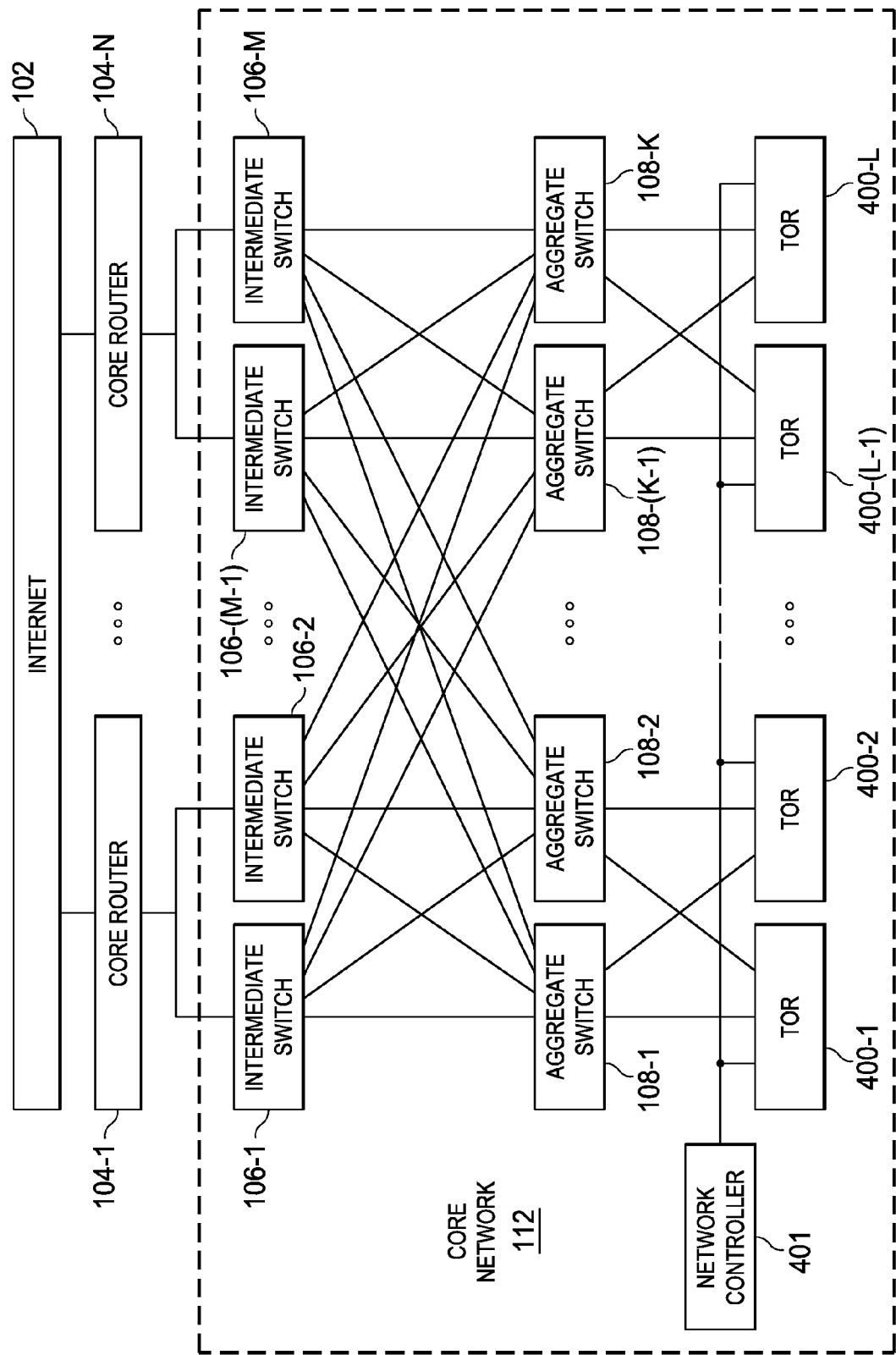
FIG. 4 is a diagram of an example of a routing model in accordance with an embodiment of the present invention.

To increase network flexibility, a new Ethernet networking standard has been developed. This standard is known as the OpenFlow protocol, and version 1.1.0 (which was released on Feb. 28, 2011) by the OpenFlow Switch Consortium is incorporated herein by reference for all purposes. In FIG. 4, an example of a routing model for this new standard can be seen. As shown, this model is similar to the model shown in FIG. 1, except that there is a network controller 401 that is able to control TOR switches 400-1 to 400-L. Network controller 401 may control other features (such as some within aggregate switches) but those control are omitted here for the sake of simplicity. With this configuration, the network controller 401 can set forwarding rules, while the TOR switches 400-1 to 400-L perform switching. This allows data centers to implements their own routing and flow management protocols.

Heavy reliance of TCAMs can be avoided with TOR switches 400-1 to 400-L, but attempting to design data-structures in hardware memory to reduce reliance on TCAMs can be difficult. Systems employing such architectures can be inefficient (wasting more memory than is used to store real addresses), hence, to be able to implement this, TOR switches 400-1 to 400-L (labeled 400 in FIG. 5) use a switching circuit 402 (which is typically an integrated circuit or IC) that is able to communicate with a lookup memory 404 (which generally has a primary table 406 and secondary table 408). The secondary table 408 generally stores ternary entries, while the primary table 406 generally stores binary entries. This allows the switching circuit 402 (which is shown in detail in FIGS. 6-13) to perform "primary" searches for more common searching events using the primary table 406 and, when the "primary" search fails, to perform "secondary" searches with the secondary table 408.

Figure 7:
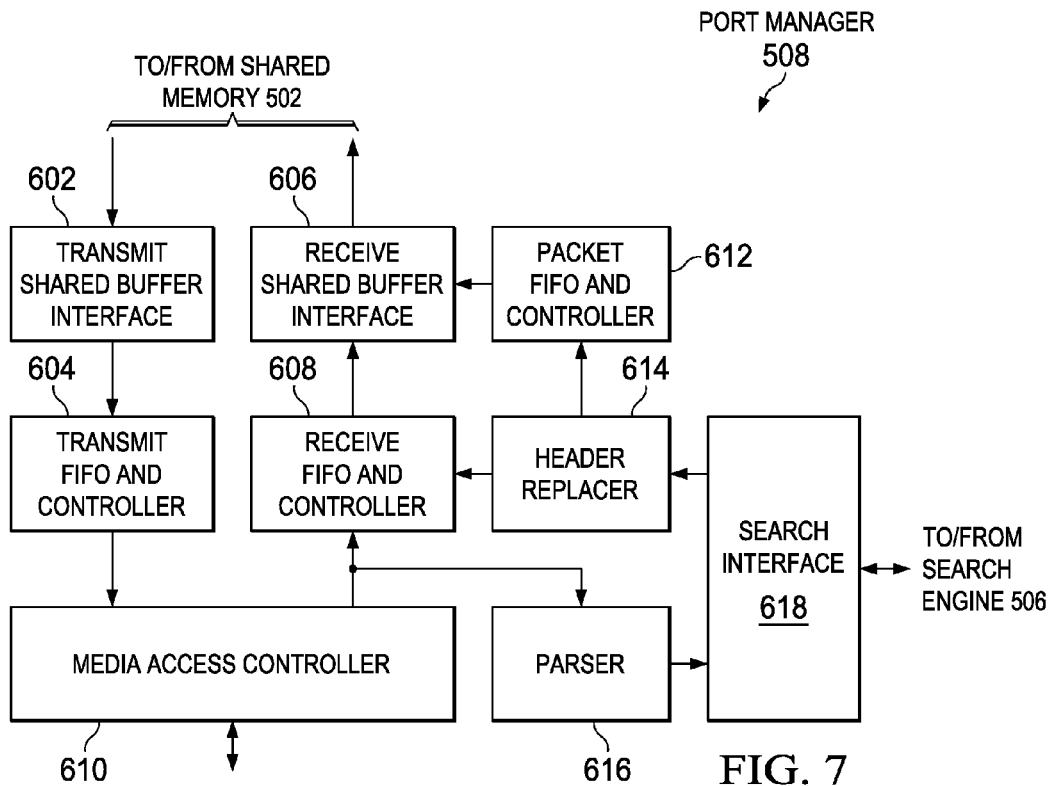
FIG. 7 is a diagram of an example of the port manager of the switching circuit of FIG. 6
Figure 10:
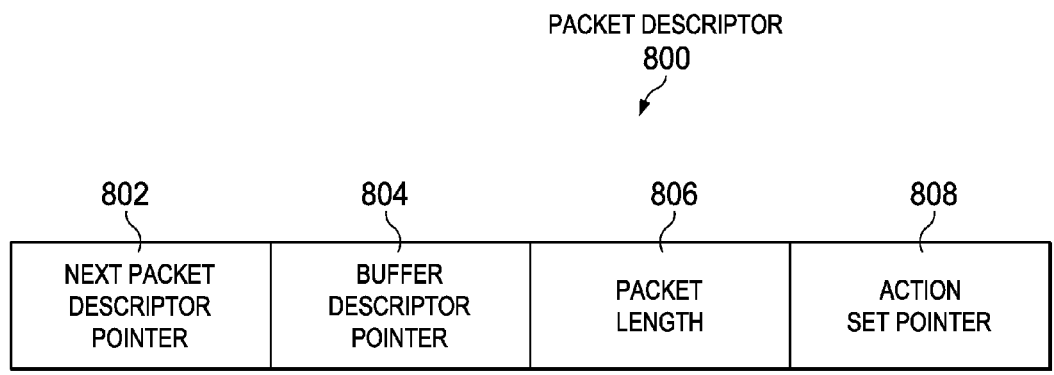
FIG. 10 is a diagram of an example of packet descriptor.

Turning first to the port managers 508-1 to 508-J of switching circuit 402, an example implementation can be seen in FIG. 7 (which is labeled 508). These port managers 508-1 to 508-J provide a bidirectional link (which can, for example, be a 10 GBase-KR or 40 GBase-KR like set forth in Institute of Electrical and Electronics Engineers (IEEE) standard 802.3ap on May 22, 2007 and IEEE standard 802.3ba on Jun. 22, 2010) to PHYs (i.e., 206-1) through the media access controller or MAC 610. This MAC 610 is coupled to coupled to the shared memory 502 through a transmit pipeline (which generally comprises a transmit shared buffer interface 602 and a transmit first-in-first-out (FIFO) memory and controller 604) and a receive pipeline (which generally comprises a receive shared buffer interface 606 and a receive FIFO and controller 608). Additionally, as part of the search structure for switching circuit 402, port managers 508-1 to 508-J also include a packet FIFO and controller 612, head replacer 614, parser 616, and search interface that interact or communicate with the receive pipeline.

Looking first to the handling of received packets, packets are initially received by the MAC 610 of one of the port managers 508-1 to 508-J. Each received packet is temporarily stored in the receive FIFO and controller 608. For each packet, a packet descriptor 800 for each packet is created and stored in the receive shared buffer interface 606, while the packet is forwarded to the shared memory 502. These packet descriptors 800 (an example of which can be seen in FIG. 10) generally comprise a next packet descriptor pointer field 802 (which indicated the packet descriptor for the next or subsequent packet), a buffer descriptor pointer 804, a packet length 806, and a action set pointer 808 and provide an association with buffer descriptors 1100 used by the shared memory 502. The buffer descriptor 1100 (an example of which can be seen in FIG. 13) is generally the "address" for the packet in the shared memory 502 and generally comprises a buffer descriptor identifier field 1102, a linking information field 1104 (which is generally written by a direct memory access controller in the interface 606), a buffer pointer field 1106 (which is generally a pointer to packet contents), a next pointer field 1108 (which is generally the next buffer descriptor), and a length field 1110 (which is generally the length of the buffer used in shared memory 502).

Figure 12:
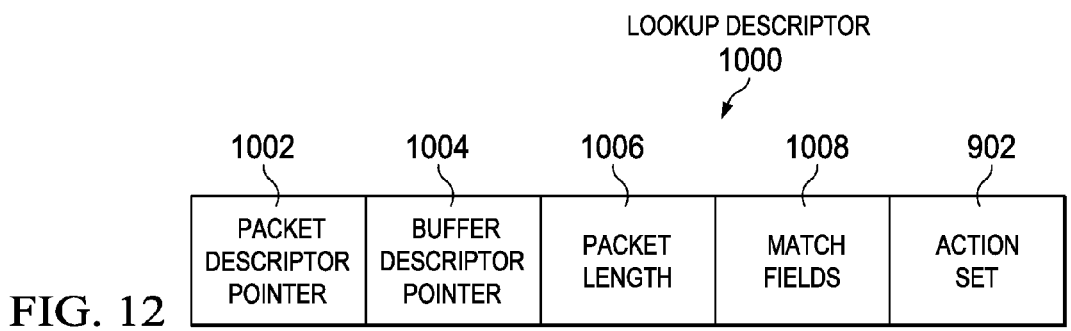
FIG. 12 is a diagram of an example of a lookup descriptor.
Figure 13:
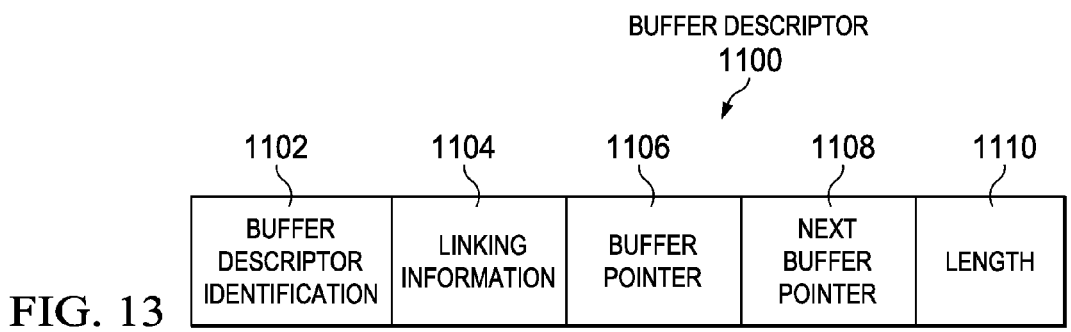
FIG. 13 is a diagram of an example of a buffer descriptor.

While the packet is being stored in shared memory 502, a lookup or search associated with the packet header is also performed. When each packet is passed to the receive FIFO and controller 608, the parser 616 (which is generally programmable) also receives the packet and extracts the packet header for each packet so as to construct a string of concatenated header fields. A lookup descriptor 1000 (an example of which is shown in FIG. 12) can then be formed for each packet and stored in the search interface 618. The lookup descriptor 1000 generally comprises a packet descriptor pointer field 1002 (which generally points to the associated packet descriptor 800), a buffer descriptor pointer field 1004 (which generally points to an associated buffer descriptor 1100), match fields 1008 (which is generally the concatenated header fields from parser 616), and an action set 902 (which is generally the set of actions to be performed on the packet). The action sets 902-1 to 902-T (as shown in the example of FIG. 11) for the packets are also generally stored in the action table 510 and are updated by the search engine 506.

Based on the lookup descriptor 1000 for each packet, the search engine 506 is able to perform a search to determine the appropriate actions to be taken. To do this, the search engine 506 uses to the primary table 406 for a "primary" binary entry search and the secondary table 408 for a "secondary" ternary entry search. Usually, a "primary" search (which is usually less "power hungry" than the "secondary" path) is followed by a "secondary" search, if the "primary" search is unsuccessful. Thus, the primary table can be thought of as a filter that reduces power consumption by limiting the use of the secondary table. Typically, ternary rules can be stored in secondary table 408-A, and the dynamic memory 410 can store binary versions of the ternary rules that are observed in actual packets. The location of dynamic memory 410 where a binary entry is stored can be computed by performing a hash function on the binary entry. This is driven by the insight that new flows are initiated much less frequently than the arrival of individual packets for each flow. Hence, flow set-up within a hash table can be done at order-of-magnitude slower pace.

With the "primary" path, a search on the primary table 406 for a binary rule is performed using a hash logic 704, where the dynamic memory 410 stores the binary rules together with a stash 412. The purpose of stash 412 is to store collided entries when multiple entries accidentally produce the identical hash function output. One or more memory arrays or banks (such as static random access memories (SRAMs) 414-1 to 414-I or embedded dynamic random access memory (eDRAM) shown in FIGS. 8 and 9) can comprise the dynamic memory 410, and the stash 412 is generally comprised of a CAM 416. Typically, the controller 702 applies a data word to the hash logic 704 based on a lookup descriptor (i.e., 1000). The hash logic 704 applies a hash function (which may be keyed for security purposes) to the match fields (1008) of the lookup descriptor so that a binary search of the dynamic memory 406 can be performed. The hash logic 704 generally implements a multi-level hash table with multiple subtables 414-1 to 414-I with independent hash functions. Typically, the dynamic memory 406 stores tables having entries (which can be referred to as rules) that associate match fields with a priority. Matches can then be returned for each substable. Additionally, a list of example match fields can be seen in Table 1 below.

TABLE 1

| Field | Width | When Applicable |
|---|---|---|
| Ingress Port | 32 | All packets |
| Metadata | 64 | |
| Ethernet Source Addr. | 48 | All packets on enable ports |
| Ethernet Dest. Addr. | 48 | All packets on enable ports |
| Ethernet type | 16 | All packets on enable ports |
| virtual local area network (VLAN) identifier | 12 | All packets with VLAN tags |
| VLAN priority | 3 | All packets with VLAN tags |
| Multiprotocol Label Switching (MPLS) label | 20 | All packets with MPLS tags |
| MPLS traffic class | 3 | All packets with MPLS tags |
| Internet Protocol version 4 (IPv4) Source Addr. | 32 | All IPv4 and Address Resolution Protocol (ARP) packets |
| IPv4 Dest. Addr. | 32 | All IPv4 and ARP packets |
| IPv4 protocol/ Address Resolution ARP opcode | 8 | All IPv4, IPv4 over Ethernet, and ARP packets |
| IPv4 Type of Service (ToS) bits | 6 | All IPv4 packets |
| Transport Source Port/ Internet Control Message Protocol (ICMP) type | 16 | All Transmission Control Protocol (TCP), User Datagram Protocol (UDP), Stream Control Transmission Protocol (SCTP), and ICMP packets |

TABLE 1-continued

| Field | Width | When Applicable |
|---|---|---|
| Transport Dest. Port/ ICMP code | 16 | All TCP, UDP, SCTP, and ICMP packets |

As mentioned above, the hash logic 704 may be keyed for security purposes. As an example, the hash logic 704 generally implements a multi-level hash table with subtables $T_1$ to $T_d$ with hash functions $h_1$ to $h_d$. A keyed hash on a binary string x with subtable $T_w$ can, for example, be:

$$h_w(x) = ((a_w x + b_w) \mod P) \mod N_w \quad (1)$$

where P is a large prime number, $a_w$ and $b_w$ (which are each less than P) for the key pair, and $N_w$ is maximum number of entries in the subtable $T_w$. Parallel searches for the subtables $T_1$ to $T_d$ can then be performed.

As part of maintaining, the primary table 406, the hash logic 704 can also add binary strings or rules to the primary table 406. To add a binary table entry or a binary string x (for example) to the primary table 406, hash function $h_w(x)$ is calculated for every subtable w, and an attempt is made to place string x into location $h_w(x)$ in any of the subtables w, when that location is vacant. If no location $h_w(x)$ is vacant, string x is inserted into the stash 412. Alternatively, when hash logic 704 is implemented as a cuckoo hash, string x can be inserted into $h_1(x)$, and a string y that occupied $h_1(x)$ is rehashed as string y into one of the vacant locations $h_w(y)$ in any of the subtables w. If all locations $h_w(y)$ are occupied, then string y is inserted into the stash 412. In effect, the hash logic 704 adds binary entries into the primary table 406 and can lookup binary entries from the primary table 406.

When, for example, no rule matching the hashed data word associated with the header for a packet can be found (which can be referred to as a match failure) during a "primary" search, further processing is performed. When a match failure occurs, the associated lookup descriptor (i.e., 1000) is stored in the packed descriptor queue 706, which generally operates as a temporary memory because of the speed difference between lookups in the primary table 406 and secondary table 408. In case there is no speed difference between lookups in primary and secondary tables (but only a power difference), the queue 706 can be omitted.

Figure 9:
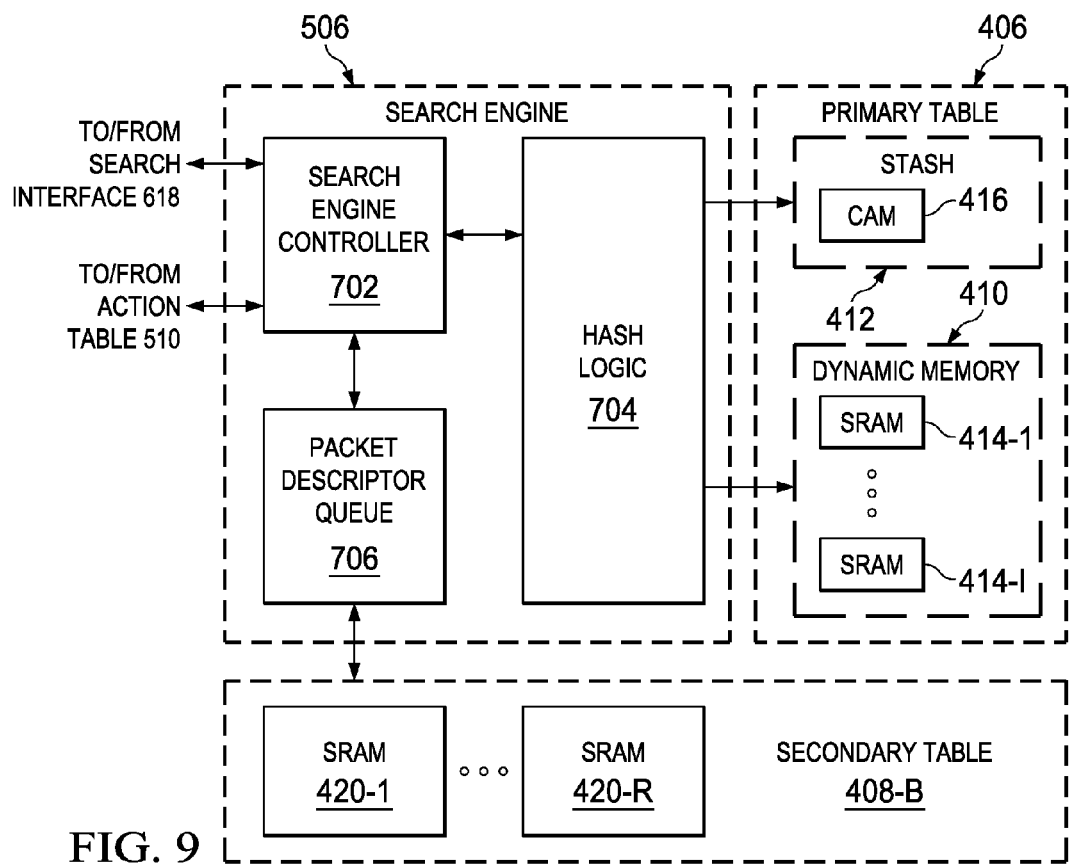

Then, a ternary search of the secondary table 408 (which can be formed of TCAM banks 418-1 to 418-R in the secondary table 408-A of FIG. 8 or can be formed of SRAM banks 420-1 to 420-R in the secondary table 408-B of FIG. 9) is performed using the match fields (1008) of the lookup descriptor (i.e., 1000). Typically, the secondary table 408 is formed of several banks of memory (as shown in FIGS. 8 and 9) that can each contains a ternary rule table. Replicated copies of the lookup descriptor (which did not yield a match in the "primary" path) can then be used to search the ternary rule tables substantially at the same time. Other search methods may also be employed. A match can then yield instructions for the action table 510. Additionally, for each match found within the secondary table 408, a new binary search rule can be created in the dynamic memory 406 for future use. More specifically, binary versions of the ternary rules that are observed in actual packets are inserted in the primary table 406. In the event that no match is found, the packet header associated with the match failure can be encapsulated and sent to the processor 402 or network controller 401 for further processing; alternately, the packet is dropped.

Usually, with match failures in the "secondary" path, a modification to the tables of the "secondary" path may be useful. In many cases, when there is a match failure in the "secondary" path, an adequate rule may be missing from the secondary table 408, so the processor 402 or network controller 401 can "insert" a new rule. Usually, the new rules are added to the banks of the secondary table 408 in a round-robin fashion to achieve load balancing among across the secondary table 408. Additionally, rules in the secondary table 408 or in primary table 406 may be removed or evicted based on a "least recently used" measure or some other statistics.

Once the rules or actions associated with each packet's header have been resolved. The packet can be modified for further processing and/or routing. This is generally achieved by header replacer 614. Typically, the header replacer 614 modifies the packet descriptor 800 for each packet by associating the action set pointer 808 with the proper action set in the action table 510 using the packet FIFO and controller 612 and receive FIFO and controller 608.

With transmit packets, the handling in port managers 508-1 to 508-J is somewhat simpler compared to received packets. Usually, processing of the packets for routing has been completed prior to transmission. When the routing has been determined a destination port 208-1 to 208-P is usually packet. As a result, the appropriate port manager 508-1 to 508-J recalls packet information from the shared memory 502 using the transmit shared buffer interface 602, and this completed packet is temporarily stored in the transmit FIFO and controller 604. The MAC 610 can then distributed the packet to the appropriate PHY (i.e., 206-1).

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features of the present invention may be employed without a corresponding use of the other features. Accordingly, it is appropriate that the appended claims be construed broadly and in a manner consistent with the scope of the invention.

The invention claimed is:
1. An apparatus comprising:
a lookup memory having a primary table and a secondary table, wherein the secondary table includes a first set of ternary rules, and wherein the primary includes a set of binary rules, and wherein each binary rule is a binary version of at least one ternary rule from the first set of ternary rules; and
a search engine that is coupled to the lookup memory, wherein the search engine includes:
an controller that is configured to receive data words; and
hash logic that is coupled to lookup memory and the controller, wherein the hash logic is configured to perform a binary search of the primary table to determine whether each data word matches at least one of the binary rules, and wherein, if there is a failed match by hash logic and primary table, the search engine is configured to perform a ternary search of the secondary table to determine whether the data word associated with the failed match matches at least one of the ternary rules from a second set of ternary rules.
2. The apparatus of claim 1, wherein the primary table further comprises:
a dynamic memory; and
stash.

3. The apparatus of claim 2, wherein the stash is a content-addressable memory (CAM).

4. The apparatus of claim 3, wherein the dynamic memory is a static random access memory (SRAM).

5. The apparatus of claim 4, wherein the secondary table further comprises a Ternary CAM (TCAM).

6. The apparatus of claim 4, wherein the apparatus further comprises:
  a shared memory;
  a plurality of port managers, wherein each port manager includes:
    an communication circuitry that is configured to receive input data packets and that is coupled to the shared memory and the search engine; and
    a parser that is coupled to the communication circuitry, wherein the parser is configured to parse each input data packet and extract its header, wherein each data word is associated with at least one header.

7. The apparatus of claim 6, wherein the apparatus further comprises an action table that is in communication with the search engine.

8. The apparatus of claim 7, wherein the communication circuitry further comprises:
  a media access controller (MAC) that is coupled to the parser;
  a transmit pipeline that is coupled between the shared memory and the MAC;
  a receive pipeline that is coupled between the shared memory and the MAC; and
  a search interface that is coupled between the parser and the search engine.

9. The apparatus of claim 8, wherein the hash logic applies a keyed hash function to each data word.

10. A method comprising:
  receiving a plurality of packets, wherein each packet has a body and a header;
  parsing each packet to extract its header;
  applying a hash function to each header;
  comparing each hashed header with a plurality of binary rules stored within a primary table, wherein each binary rule is a binary version of at least one ternary rule from a first set of ternary rules; and
  for each match failure with the plurality of rules, searching a secondary table using the header associated with each match failure, wherein the secondary table includes a second set of ternary rules.

11. The method of claim 10, wherein the primary table further comprises:
  an SRAM; and
  a CAM.

12. The method of claim 11, wherein the secondary table is a TCAM.

13. The method of claim 12, wherein the step of searching the secondary table further comprises simultaneously searching a plurality of banks within the TCAM.

14. The method of claim 11, wherein the method further comprises:
  generating a new rule and a new action for each match failure; and
  storing the new rule and new action in the SRAM.

15. The method of claim 14, wherein the hash function is a keyed hash function.

16. An apparatus comprising:
  a primary table including a set of binary rules, and wherein each binary rule is a binary version of at least one ternary rule from a first set of ternary rules;
  a secondary table including a second set of ternary rules;
  a switching circuit having:
    a shared memory;
    a search engine including:
      an controller that is configured to receive data words; and
      hash logic that is coupled to lookup memory and the controller, wherein the hash logic is configured to perform a binary search of the primary table to determine whether each data word matches at least one of the binary rules, and wherein, if there is a failed match by hash logic and primary table, the search engine is configured to perform a ternary search of the secondary table to determine whether the data word associated with the failed match matches at least one of the ternary rules from the second set of ternary rules; and
    a plurality of port managers that are each in communication with the search engine; and
  input/output (I/O) circuit that is in communication with the switching circuit.

17. The apparatus of claim 16, wherein the primary table further comprises:
  an SRAM; and
  a CAM.

18. The apparatus of claim 17, wherein each port manager further comprises:
  a MAC that is coupled to the I/O circuitry so as to receive input data packets;
  a transmit pipeline that is coupled between the shared memory and the MAC;
  a receive pipeline that is coupled between the shared memory and the MAC;
  a parser that is coupled to the receive pipeline, wherein the parser is configured to parse each input data packet and extract its header, wherein each data word is associated with at least one header; and
  a search interface that is coupled between the parser and the search engine.

19. The apparatus of claim 18, wherein the I/O circuitry further comprises:
  a plurality of physical layer (PHY) circuits, wherein each PHY circuit is in communication with the switching circuit; and
  a plurality of ports, wherein each port is in communication with at least one of the PHY circuits.

20. The apparatus of claim 19, wherein the secondary table further comprises a TCAM.

* * * * *